(12) United States Patent
Kuhl et al.

(10) Patent No.: US 8,384,519 B2
(45) Date of Patent: Feb. 26, 2013

(54) READER DEVICE FOR RADIO FREQUENCY IDENTIFICATION TRANSPONDER WITH TRANSPONDER FUNCTIONALITY

(75) Inventors: Carmen Kuhl, Espoo (FI); Peter Wakim, Boston, MA (US); Petri Vesikivi, Espoo (FI); Heikki Huomo, Espoo (FI)

(73) Assignee: Nokia Corporation, Espoo (FI)

( * ) Notice: Subject to any disclaimer, the term of this patent is extended or adjusted under 35 U.S.C. 154(b) by 1070 days.

(21) Appl. No.: 10/565,260

(22) PCT Filed: Jul. 22, 2003

(86) PCT No.: PCT/IB03/02900
§ 371 (c)(1),
(2), (4) Date: Aug. 2, 2006

(87) PCT Pub. No.: WO2005/008575
PCT Pub. Date: Jan. 27, 2005

(65) Prior Publication Data
US 2006/0280149 A1 Dec. 14, 2006

(51) Int. Cl.
*H04Q 5/22* (2006.01)
(52) U.S. Cl. ............ 340/10.1; 340/539.23; 340/539.11
(58) Field of Classification Search .................. 340/10.1, 340/10.2, 10.5, 572.1, 572.3, 539.11, 539.23; 455/41, 41.1, 41.2; 235/451
See application file for complete search history.

(56) References Cited

U.S. PATENT DOCUMENTS

| | | | |
|---|---|---|---|
| 4,599,490 A | 7/1986 | Cornell et al. | |
| 4,698,781 A | 10/1987 | Cockerell, Jr. | |
| 4,821,309 A | 4/1989 | Namekawa | |
| 5,138,329 A | 8/1992 | Saarnimo et al. | |
| 5,345,596 A | 9/1994 | Buchenhorner et al. | |
| 5,497,140 A | 3/1996 | Tuttle | |
| 5,525,994 A | 6/1996 | Hurta et al. | |
| 5,577,266 A | 11/1996 | Takahisa et al. | |

(Continued)

FOREIGN PATENT DOCUMENTS

| | | |
|---|---|---|
| CN | 1027611 C | 2/1995 |
| CN | 1260939 | 7/2000 |

(Continued)

OTHER PUBLICATIONS

Standard ECMA-340, Near Field Communication—Interface and Protocol (NFCIP-1), XP002290360, Dec. 2002.

(Continued)

*Primary Examiner* — Nabil Syed
(74) *Attorney, Agent, or Firm* — Locke Lord LLP

(57) ABSTRACT

A reader device for radio frequency identification transponders, which implements enhanced radio frequency identification transponder functionality. The reader device is capable of serving as a radio frequency identification transponder. Such a reader device includes a reader logic unit, a radio/high frequency (RF/HF) interface and an antenna, and is adapted to communicate at least with radio frequency identification transponders in a reader operation mode. The reader device also includes a transponder logic unit that is connected to the reader device and in particular to the radio/high frequency (RF/HF) interface such that the reader device acts as a radio frequency identification transponder in a transponder operation mode. In particular, the transponder logic unit is adapted to communicate with other reader devices for radio frequency identification transponders. The reader device for radio frequency identification transponders can be attached, connected, implemented and/or embedded in electronic device and particularly portable electronic devices, respectively.

21 Claims, 2 Drawing Sheets

U.S. PATENT DOCUMENTS

| | | | |
|---|---|---|---|
| 5,625,669 A | 4/1997 | McGregor et al. |
| 5,627,517 A | 5/1997 | Theimer et al. |
| 5,729,594 A | 3/1998 | Klingman |
| 5,815,811 A | 9/1998 | Pinard et al. |
| 5,887,253 A | 3/1999 | O'Neil et al. |
| 5,898,679 A | 4/1999 | Brederveld et al. |
| 5,903,830 A | 5/1999 | Joao et al. |
| 5,917,865 A | 6/1999 | Kopmeiners et al. |
| 5,917,913 A | 6/1999 | Wang |
| 5,943,624 A | 8/1999 | Fox et al. |
| 6,002,984 A | 12/1999 | Aughenbaugh |
| 6,011,976 A | 1/2000 | Michaels et al. |
| 6,025,780 A | 2/2000 | Bowers et al. |
| 6,101,375 A | 8/2000 | Tuttle et al. |
| 6,104,290 A | 8/2000 | Naguleswaran |
| 6,104,333 A | 8/2000 | Wood, Jr. |
| 6,115,782 A | 9/2000 | Wolczko et al. |
| 6,130,623 A | 10/2000 | MacLellan |
| 6,144,847 A | 11/2000 | Altschul et al. |
| 6,144,848 A | 11/2000 | Walsh et al. |
| 6,167,514 A | 12/2000 | Matsui et al. |
| 6,175,860 B1 | 1/2001 | Gaucher |
| 6,175,922 B1 | 1/2001 | Wang |
| 6,236,186 B1 | 5/2001 | Helton et al. |
| 6,282,407 B1 | 8/2001 | Vega et al. |
| 6,297,737 B1 | 10/2001 | Irvin |
| 6,337,856 B1 | 1/2002 | Schanhals et al. |
| 6,382,507 B2 | 5/2002 | Schilling |
| 6,404,339 B1 | 6/2002 | Eberhardt |
| 6,422,462 B1 | 7/2002 | Cohen |
| 6,424,623 B1 | 7/2002 | Borgstahl et al. |
| 6,424,706 B1 | 7/2002 | Katz et al. |
| 6,434,159 B1 | 8/2002 | Woodward et al. |
| 6,445,732 B1 | 9/2002 | Beamish et al. |
| 6,456,039 B1 | 9/2002 | Lauper et al. |
| 6,456,234 B1 | 9/2002 | Johnson |
| 6,462,647 B1 | 10/2002 | Roz |
| 6,483,106 B1 | 11/2002 | Ohtomo et al. |
| 6,487,180 B1 | 11/2002 | Borgstahl et al. |
| 6,488,209 B1 | 12/2002 | Hunt et al. |
| 6,501,741 B1 | 12/2002 | Mikkonen et al. |
| 6,512,919 B2 | 1/2003 | Ogasawara |
| 6,539,422 B1 | 3/2003 | Hunt et al. |
| 6,542,721 B2 | 4/2003 | Boesen |
| 6,566,997 B1 | 5/2003 | Bradin |
| 6,634,560 B1 | 10/2003 | Grabau |
| 6,663,063 B2 | 12/2003 | Tatta |
| 6,677,852 B1 | 1/2004 | Landt |
| 6,681,120 B1 | 1/2004 | Kim |
| 6,687,679 B1 | 2/2004 | Van Luchene et al. |
| 6,690,402 B1 | 2/2004 | Waller et al. |
| 6,697,375 B1 | 2/2004 | Meng |
| 6,705,520 B1 | 3/2004 | Pitroda et al. |
| 6,710,576 B1 | 3/2004 | Kaufman et al. |
| 6,732,176 B1 | 5/2004 | Stewart et al. |
| 6,783,071 B2 | 8/2004 | Levine et al. |
| 6,792,292 B1 | 9/2004 | Chatani |
| 6,832,082 B1 | 12/2004 | Ramaswamy et al. |
| 6,842,621 B2 | 1/2005 | Labun et al. |
| 6,892,052 B2 | 5/2005 | Kotola et al. |
| 6,892,082 B2 | 5/2005 | Boesen |
| 6,989,741 B2 | 1/2006 | Kenny et al. |
| 7,020,474 B2 | 3/2006 | Scott |
| 7,039,600 B1 | 5/2006 | Meek et al. |
| 7,049,963 B2 | 5/2006 | Waterhouse et al. |
| 7,098,770 B2 * | 8/2006 | Charrat et al. ............... 340/10.1 |
| 7,152,040 B1 | 12/2006 | Hawthorne et al. |
| 7,174,564 B1 | 2/2007 | Weatherspoon et al. |
| 7,190,257 B2 | 3/2007 | Maltseff et al. |
| 7,231,372 B1 | 6/2007 | Prange et al. |
| 7,433,677 B2 | 10/2008 | Kantola et al. |
| 7,565,108 B2 | 7/2009 | Kotola et al. |
| 7,657,490 B1 | 2/2010 | Nakajima |
| 7,933,589 B1 | 4/2011 | Mamdani et al. |
| 8,233,881 B2 | 7/2012 | Kantola et al. |
| 2001/0007815 A1 * | 7/2001 | Philipsson ..................... 455/41 |
| 2001/0046862 A1 | 11/2001 | Coppinger et al. |
| 2001/0051915 A1 | 12/2001 | Ueno et al. |
| 2002/0011519 A1 | 1/2002 | Shults, III |
| 2002/0020743 A1 | 2/2002 | Sugukawa et al. |
| 2002/0022483 A1 | 2/2002 | Thompson et al. |
| 2002/0022504 A1 | 2/2002 | Horii |
| 2002/0023215 A1 | 2/2002 | Wang et al. |
| 2002/0026586 A1 | 2/2002 | Ito |
| 2002/0065065 A1 | 5/2002 | Lunsford et al. |
| 2002/0106988 A1 | 8/2002 | Davie et al. |
| 2002/0107742 A1 | 8/2002 | Magill |
| 2002/0145039 A1 | 10/2002 | Carroll |
| 2002/0154607 A1 | 10/2002 | Forstadius et al. |
| 2002/0164994 A1 | 11/2002 | Lundberg |
| 2002/0170961 A1 | 11/2002 | Dickson et al. |
| 2002/0188863 A1 | 12/2002 | Friedman |
| 2003/0008647 A1 | 1/2003 | Takatori et al. |
| 2003/0030542 A1 | 2/2003 | Von Hoffmann |
| 2003/0051767 A1 | 3/2003 | Coccaro et al. |
| 2003/0051945 A1 | 3/2003 | Coccaro et al. |
| 2003/0055735 A1 | 3/2003 | Cameron et al. |
| 2003/0093187 A1 | 5/2003 | Walker |
| 2003/0114104 A1 | 6/2003 | Want et al. |
| 2003/0141989 A1 * | 7/2003 | Arisawa et al. .......... 340/870.01 |
| 2003/0146821 A1 | 8/2003 | Brandt |
| 2003/0148775 A1 | 8/2003 | Spriestersbach et al. |
| 2004/0002305 A1 | 1/2004 | Byman-Kivivuori et al. |
| 2004/0012531 A1 | 1/2004 | Toda |
| 2004/0039661 A1 | 2/2004 | Fuzell-Casey et al. |
| 2004/0099738 A1 | 5/2004 | Waters |
| 2004/0164166 A1 | 8/2004 | Mahany et al. |
| 2005/0017068 A1 | 1/2005 | Zalewski et al. |
| 2005/0026635 A2 | 2/2005 | Michaels et al. |
| 2005/0034029 A1 | 2/2005 | Ramberg et al. |
| 2005/0037707 A1 * | 2/2005 | Lewis ......................... 455/41.1 |
| 2005/0040951 A1 | 2/2005 | Zalewski et al. |
| 2005/0077356 A1 | 4/2005 | Takayama et al. |
| 2005/0079817 A1 | 4/2005 | Kotola et al. |
| 2005/0134461 A1 | 6/2005 | Gelbman et al. |
| 2005/0136949 A1 | 6/2005 | Barnes, Jr. |
| 2005/0218230 A1 * | 10/2005 | Amtmann et al. ............ 235/451 |
| 2005/0237843 A1 | 10/2005 | Hyde |
| 2005/0269411 A1 | 12/2005 | Vesikivi et al. |
| 2006/0132310 A1 | 6/2006 | Cox et al. |
| 2006/0145865 A1 | 7/2006 | Forster |
| 2006/0168644 A1 | 7/2006 | Richter et al. |
| 2006/0244592 A1 | 11/2006 | Kansala et al. |
| 2007/0063816 A1 | 3/2007 | Murakami et al. |
| 2007/0236350 A1 | 10/2007 | Nystrom et al. |
| 2008/0057867 A1 | 3/2008 | Trappeniers et al. |
| 2008/0231428 A1 | 9/2008 | Kuhl |
| 2008/0238617 A1 | 10/2008 | Kuhl et al. |
| 2009/0058618 A1 | 3/2009 | Gopalan et al. |

FOREIGN PATENT DOCUMENTS

| | | |
|---|---|---|
| CN | 1643806 | 7/2005 |
| DE | 100 42 805 A1 | 3/2002 |
| EP | 0780802 | 6/1997 |
| EP | 0 926 623 A1 | 6/1999 |
| EP | 1178445 | 2/2002 |
| EP | 1182833 | 2/2002 |
| EP | 1330075 | 9/2002 |
| EP | 1012793 | 4/2003 |
| EP | 1545069 | 6/2005 |
| EP | 1633104 | 8/2006 |
| EP | 1522955 | 8/2008 |
| EP | 1725977 | 4/2009 |
| GB | 2308947 | 9/1997 |
| GB | 2342010 | 3/2000 |
| GB | 2364457 | 1/2002 |
| JP | 09172409 | 6/1997 |
| JP | 2002058066 | 2/2002 |
| JP | 2002063652 | 2/2002 |
| JP | 2002-271850 | 9/2002 |
| JP | 2005-218127 | 8/2005 |
| JP | 2006-525580 | 11/2006 |
| WO | WO9300750 | 1/1993 |
| WO | WO9806214 | 2/1998 |
| WO | WO9858510 | 12/1998 |
| WO | WO9905659 | 2/1999 |
| WO | WO0065747 | 11/2000 |

| | | |
|---|---|---|
| WO | WO0103311 | 1/2001 |
| WO | WO0139103 | 5/2001 |
| WO | WO0139108 | 5/2001 |
| WO | WO0145038 | 6/2001 |
| WO | WO0145319 | 6/2001 |
| WO | WO0180193 | 10/2001 |
| WO | WO0203625 | 1/2002 |
| WO | WO 02071325 A1 * | 9/2002 |
| WO | WO02099715 | 12/2002 |
| WO | WO03007623 | 1/2003 |
| WO | WO03025834 | 3/2003 |
| WO | WO03079281 | 9/2003 |
| WO | WO03081519 | 10/2003 |
| WO | WO03081787 | 10/2003 |
| WO | WO2004098089 | 11/2004 |
| WO | WO2004110017 | 12/2004 |
| WO | WO 2008024531 | 2/2008 |
| WO | WO2008024531 | 2/2008 |

OTHER PUBLICATIONS

Haselsteiner et al., "Security in Near Field Communication (NFC)", http://events.iaik.tugraz.atIRFIDSec06/ Program/papers/002%20-%20Security%20in%20NFC.pdf, copy downloaded from web Jul. 22, 2010.
European Extended Search Report dated Jan. 19, 2010 from European Patent Application No. 09164761.0, pp. 1-7.
Dec. 13, 2007 European Office Action dated Dec. 13, 2007 from European Patent Application No. 04721251.9, pp. 1-4.
European Office Action dated Jun. 17, 2008 from European Patent Application No. 04721251.9, pp. 1-4.
European Office Action dated May 18, 2006 from European Patent Application No. 03817515.4, pp. 1-4.
European Office Action dated Sep. 20, 2006 from European Patent Application No. 03817515.4, pp. 1-3.
European Office Action dated Mar. 6, 2007 from European Patent Application No. 03817515.4, pp. 1-3.
European Office Action dated Dec. 21, 2007 from European Patent Application No. 03817515.4, pp. 1-5.
European Office Action dated Sep. 9, 2008 from European Patent Application No. 03817515.4, pp. 1-3.
European Search Report dated Jan. 30, 2007 from European Patent Application No. 03744931.1, pp. 1-3.
European Office Action dated Oct. 12, 2007 from European Patent Application No. 03744931.1, pp. 1-8.
European Office Action dated Oct. 21, 2009 from European Patent Application No. 03744931.1, pp. 1-6.
European Supplemental Search Report dated Feb. 20, 2008 from European Patent Application No. 05725885.7, pp. 1-3.
European Office Action dated Oct. 21, 2009 from European Patent Application No. 05725885.7, pp. 1-8.
European Office Action dated Oct. 10, 2008 from European Patent Application No. 01927886.0, pp. 1-4.
Chinese Office Action dated Jun. 20, 2008 from Chinese Patent Application No. 200480042848.5, pp. 1-9.
Chinese Office Action dated Dec. 12, 2008 from Chinese Patent Application No. 200480042848.5, pp. 1-6.
Chinese Office Action dated Jul. 20, 2007 from Chinese Patent Application No. 03826782.9, pp. 1-18.
Chinese Office Action dated Mar. 21, 2008 from Chinese Patent Application No. 03826782.9, pp. 1-16.
Chinese Final Office Action dated Jul. 4, 2008 from Chinese Patent Application No. 03826782.9, pp. 1-16.
Chinese Office Action dated Mar. 20, 2009 from Chinese Patent Application No. 03826782.9, pp. 1-6.
Chinese Office Action dated Mar. 30, 2007 from Chinese Patent Application No. 03806971.7, pp. 1-17.
Chinese Office Action dated Dec. 28, 2007 from Chinese Patent Application No. 03806971.7, pp. 1-5.
Chinese Office Action dated Aug. 8, 2008 from Chinese Patent Application No. 03806971.7, pp. 1-8.
Chinese Office Action dated Jul. 31, 2009 from Chinese Patent Application No. 03806971.7, pp. 1-9.
Chinese Office Action dated Apr. 16, 2004 from Chinese Patent Application No. 01117943.0, pp. 1-9.
Chinese Office Action dated Jun. 17, 2005 from Chinese Patent Application No. 01117943.0, pp. 1-9.
Korean Office Action dated Jun. 25, 2007 from Korean Patent Application No. 10-2006-7017374, pp. 1-2.
Korean Office Action dated Jan. 15, 2008 from Korean Patent Application No. 10-2006-7017374, pp. 1-5.
Korean Office Action dated Dec. 15, 2006 from Korean Patent Application No. 10-2006-7001417, pp. 1-7.
Great Britain Search Report dated Nov. 17, 2000 from British Application No. 0010983.5, pp. 1-3.
Great Britain Office Action dated Aug. 7, 2003 from British Application No. 0010983.5, pp. 1-2.
Great Britain Search Report dated Nov. 20, 2000 from British Application No. 0010982.7, pp. 1-2.
Great Britain Office Action dated Sep. 23, 2003 from British Patent Application No. 0010982.7, pp. 1-2.
Japanese Office Action dated May 7, 2008 from Japanese Patent Application No. 2005-504352, pp. 1-6.
Japanese Final Office Action dated Nov. 11, 2008 from Japanese Patent Application No. 2005-504352, pp. 1-6.
Japanese Office Action dated Jun. 16, 2008 from Japanese Patent Application No. 2003-579374, pp. 1-3.
Japanese Final Office Action dated Jun. 1, 2009 from Japanese Patent Application No. 2003-579374, pp. 1-3.
International Search Report and Written Opinion dated Oct. 22, 2004 from Patent Cooperation Treaty Application No. PCT/IB2004/000784, pp. 1-4.
International Preliminary Report on Patentability dated Jun. 27, 2005 from Patent Cooperation Treaty Application No. PCT/IB2003/002900, pp. 1-11.
International Search Report dated Feb. 11, 2004 from Patent Cooperation Treaty Application No. PCT/IB2003/002900, pp. 1-3.
International Search Report and Written Opinion dated Aug. 11, 2006 from Patent Cooperation Treaty Application No. PCT/US05/09066, pp. 1-13.
International Invitation to Pay Additional Search Fees dated Apr. 24, 2006 from Patent Cooperation Treaty Application No. PCT/US05/09066, pp. 1-2.
International Search Report dated Oct. 17, 2003 from Patent Cooperation Treaty Application No. PCT/IB03/00897, pp. 1-3.
International Search Report dated Nov. 9, 2001 from Patent Cooperation Treaty Application No. PCT/EP01/03950, pp. 1-6.
International Preliminary Examination Report dated Sep. 23, 2002 from Patent Cooperation Treaty Application No. PCT/EP01/03950, pp. 1-10.
Written Opinion dated Apr. 8, 2002 from Patent Cooperation Treaty Application No. PCT/EP01/03950, pp. 1-3.
Detailed Written Opinion dated Jul. 16, 2002 from Patent Cooperation Treaty Application No. PCT/EP01/03950, pp. 1-6.
U.S. File History for U.S. Appl. No. 09/848,515.
U.S. File History for U.S. Appl. No. 12/196,408.
U.S. File History for U.S. Appl. No. 10/105,320.
U.S. File History for U.S. Appl. No. 10/804,081.
U.S. File History for U.S. Appl. No. 09/848,459.
File History for U.S. Appl. No. 10/586,771, Mar. 30, 2011, 272 pages.
File History for U.S. Appl. No. 10/592,739, Mar. 30, 2011, 111 pages.
File History for U.S. Appl. No. 10/592,811, Mar. 30, 2011, 110 pages.
File History for EP Application No. 05725885.7 as retrieved from European Patent Office Electronic File System on Mar. 30, 2011, 206 pages.
International Preliminary Report on Patentability dated Sep. 20, 2006 from PCT Application No. PCT/IB2004/000784, 4pgs.
File History for U.S. Appl. No. 10/592,739, Oct. 5, 2011.
Office Action dated Jun. 27, 2011 from Canadian Application No. 2,533,029, 3 pages.
Inoue et al., "A Ferroelectric Memory Embedded in a RFID Transponder with 2.4V Operation and 10 Year Retention at 70° C.", IEEE, 1997, pp. 290-291.
File History for U.S. Appl. No. 10/592,739.
File History for U.S. Appl. No. 10/592,811.

Office Action with translation dated Oct. 27, 2011 from Korean Application No. 10-2010-0064969, 5 pages.
Office Action dated Oct. 20, 2011 from Japanese Application No. 2009-229506, 4 pages.
Office Action with translation dated Jun. 30, 2011 from Chinese Application No. 038069717, 6 pages.
Bisdikian, C., "An Overview of the Bluetooth Wireless Technology", IEEE Communications Magazine, Dec. 2001, pp. 86-94.

Zdravkovic, A., "Wireless Point of Sale Terminal for Credit and Debit Payments Systems", IEEE, 1988, pp. 890-893.
"Bluetooth Measurements in CMU200", Universal Radio Communication Tester CMU 200, pp. 30-33.
Skipper, J., "Electronic Banking and Payments", The Institution of Electrical Engineers, IEE, Savoy Place, London, 1998, 6 pages.

* cited by examiner

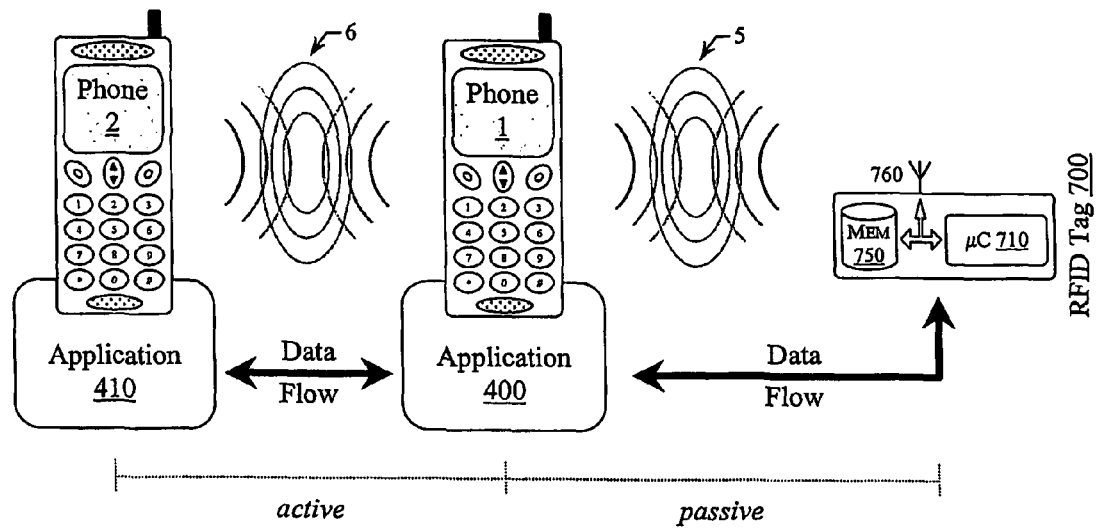
Fig. 1 (State of the Art)
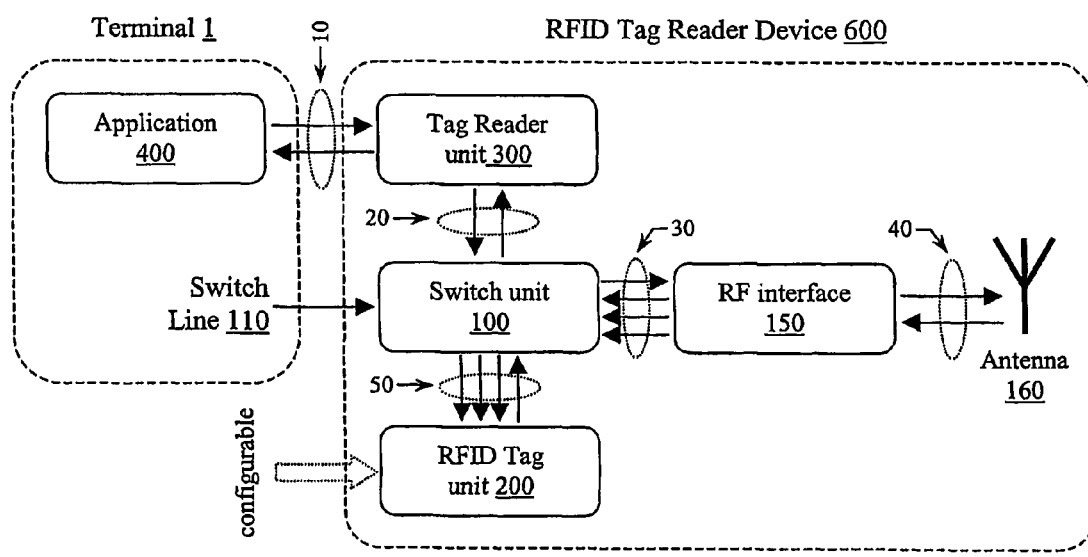
Fig. 2

READER DEVICE FOR RADIO FREQUENCY IDENTIFICATION TRANSPONDER WITH TRANSPONDER FUNCTIONALITY

The present invention relates to a communication device, which implements an enhanced radio frequency identification transponder reading functionality. In particular, the present invention relates to a radio frequency identification transponder reader, which is capable to serve as a radio frequency identification transponder.

Radio frequency identification (RFID) transponders herein also referred to as RFID tags are widely used for labeling objects, to establish person's identities and to recognize objects provided with RFID tags. Basically, RFID tags include an electronic circuit and a radio frequency (RF) interface and high frequency (HF) interface, respectively, which is coupled to an antenna and the electronic circuit. The RFID tags are typically accommodated in small containers. Depending on the requirements made on the deployment of the RFID tags (i.e. the data transmission rate, energy of the interrogation, transmission range etc.) different types are provided for data/information transmission on different radio frequencies within a range from several 10-100 kHz to some GHz (e.g. 134 kHz, 13.56 MHz, 860-928 MHz etc., only to present a number of example frequencies employed). Two main classes of RFID tags can be distinguished, i.e. passive RFID tags which are activated by RFID tag readers which generate an interrogation signal, for example an RF signal at a certain frequency and active RFID tags which comprise own power supplies such as batteries or accumulators for energizing.

Passive inductive RFID tags are energized by passing through an energizing electromagnetic field, i.e. the interrogation signal. The RFID tags resonate at a frequency of the electromagnetic field that causes interference in the electromagnetic field, which can be detected and evaluated by the RFID tag reader. The amount of information that can be provided by passive inductive RFID tags and their transmission range is limited.

Passive or backscatter RFID tags reflect a small amount of the electromagnetic energy of an interrogation signal radiated by the RFID tag reader. The reflected signal can be modulated or encoded in any way to embed RFID tag information stored in the RFID tag to be transmitted to the RFID tag reader. In detail, backscatter RFID tags receive the electromagnetic energy of the interrogation signal and convert a small amount of the electromagnetic energy for energizing the electronic components of the RFID tag. The RFID tag components can generate a data stream comprising a clock signal and stored RFID tag information to be modulated or encoded on the reflected signal.

Active RFID tags include a miniaturized transceiver and are conventionally based on microprocessor technology. The active RFID tags may be polled for data transmission or may transmit in a self-controlled way. The microprocessor technology allows performing software algorithms for parsing received (interrogation) RF signals and for generating corresponding RF response signals.

Especially active RFID tags allow providing a larger amount of information and having a longer transmission range. Depending on the complexity of the RFID tags the information stored non-volatile in the RFID tags may be read-only information or is modifiable (re-programmable) by the RFID tag reader which is operated as a RFID writer.

RFID tags are used in numerous application fields such as information storage devices allowing wireless read-out access. In detail application fields may comprise electronic article surveillance (EAS), storage administration systems, anti-theft systems, access controls, identification systems (persons, pets, wild life, children etc.), toll collection, traffic management systems, rail car identification, high value asset controls and the like. The fields of applications are not limited to the given enumeration. The operation frequency of RFID tags lies within a frequency range of several kilohertz up to several gigahertzes. The RFID tags may have various containers, which are adapted to the purpose and application of the RFID tags. RFID tags used as key replacement for accessing controlled area like an office block may be integrated in a key fob or may have credit card shape for being accommodated in a pocket. Moreover RFID tags may be provided with adhesives or fixed onto adhesive labels, films etc. to be applied on articles, products etc.

The market of microprocessor based portable terminals is still growing fast and the acceptance of mobile terminal is undiminished. Portable terminals device offer the ability to a user to retrieve, process, modify and add informational data at any place at any time. Moreover, portable terminals, which include a RFID tag reader, are well known in the art. Such portable terminals are able to receive the RFID tag information for further processing. For example, a portable terminal may be employed to receive RFID tag information of RFID tags substituting the bar codes used to label uniquely products.

To enlighten state of the art RFID tags and RFID tag readers, the following description refers to FIG. 1. FIG. 1 shows a schematic block diagram to describe state of the art use of RFID tags and RFID tag readers.

In a first approach, the state of the art communication between RFID tags readers and RFID tags will be enlightened. The block diagram shows a portable terminal 1 which operates an application 400 and which has tag reader capability such that data flow is established between a RFID tag 700 and the application 400. The portable terminal 1 is any electronic terminal device, which is adapted to communicate with a RFID tag 700.

The portable terminal 1 is connected to a RFID tag reader to enable communications between application 400 operated on the portable terminal 1 and the RFID tag 700. The RFID tag reader may be realized as a stand-alone unit which may be detachably connected to the portable terminal 1 or which may be embedded in the portable terminal 1.

The RFID tag 700 illustrated in FIG. 1 includes a storage component (Mem) 750 and a microprocessor (µP) or microcontroller (µC) 710. An antenna 760 allows the RFID tag 700 to receive an interrogation signal and to transmit a response signal e.g. on receiving of such an interrogation signal. The storage component 750 contains the RFID tag information that comprises in accordance with the present invention at least a tag identification sequence, which is suitable to address a plurality of individual services. An interrogation signal and a response signal are communicated with the portable terminal 1 via the wireless communication link 5 which is a radio frequency (RF) communication link, or depending on the deployed frequency actually a high frequency (HF) communication link. The coupling of RFID tag reader and RFID tag is preferably inductive. The storage component 750 may be one of a read-only or a read/write (i.e. random access) storage component embodied as volatile or non-volatile memory. In case of a read-only storage component the RFID tag reader is allowed to retrieve stored information, whereas in case of read/write storage component the RFID tag reader may be allowed to read information and to write information. The communication link established between RFID tag reader and RFID tag 700 allows for an application 400 operated on the portable terminal 1 transmitting one or several commands to the RFID tag 700 to request information, which is answered by RFID tag 700 by a corresponding response comprising the requested information. The received request information is supplied to the originally requesting application 400 to be processed. The one or several commands may be simply the interrogation signal or may be embedded in the interrogation signal by modulation. The RFID tag reader establishes a data flow between RFID tag 700 and application 400.

The rising use of RFID tags promotes standardization efforts to establish a broadly applicable communication framework between RFID tag reader and RFID tags. Such a standard is established by ECMA International, Geneva, Switzerland in from of the near field commination standard (ECMA-340) dated on December 2002. The standard defines communication modes for near field communication interface and protocol (NFCIP-1) to be used for RFID tag readers and RFID tags. It also defines both an active and passive communication modes to realize a communication network using near field communication enabled devices for networked products and also for consumer equipment. The standard specifies, in particular, modulation schemes, codings, transfer speeds, and frame format of the RF/HF interface, as well as initialization schemes and conditions required for data collision control during initialization. Furthermore, the ECMA Standard defines a transport protocol including protocol activation and data exchange methods.

The aforementioned RFID tag reader and RFID tag communication is covered by the passive communication mode. The active communication mode relates to communications between RFID tag readers.

Correspondingly in a second approach, the state of the art communication between RFID tags readers will be enlightened in view of FIG. 1. A second portable terminal 2 is provided which is connected to a RFID tag reader. The RFID tag reader may be realized as a stand-alone unit which may be detachably connected to the portable terminal 2 or which may be embedded in the portable terminal 2. Both the RFID tag readers of portable terminal 1 and the portable terminal 2 support the active communication mode which means, that the both RFID tag readers are adapted to communicate with each other by employing the aforementioned near field communication interface and protocol (NFCIP-1) standard. During active communication mode one of the participating RFID tag readers of the portable terminal 1 and portable terminal 2 actively simulates a RFID tag whereas the other one actively simulates a RFID tag reader. The data communication is established via the wireless communication link 6, which is a radio and high frequency (RF/HF) communication link, respectively. This wireless communication link 6 provide data flow between the application 400 operated on the portable terminal 1 and an application 410 operated on the portable terminal 410.

But in contrast to passive RFID tags which are energized by the interrogation signal of the RFID tag reader, both participating RFID tag readers are always energized independently, i.e. have their own power supply to generate the radio/high frequency (RF/HF) signals used for data communications between those. Therefore, the RFID tag reader, which actively simulates a RFID tag, may be regarded as an active RFID tag.

Despite of the advantages provided by the RFID tag readers intercommunication several drawbacks of the aforementioned explanation may be identified. The realization of the RFID tag reader—RFID tag reader intercommunication requires a great effort in development since the interface and protocol definitions are sophisticated and show a significantly complex functionality which is of course required to ensure interoperability between RFID tag readers of different manufacturers. Moreover, the realization of the RFID tag reader—RFID tag reader intercommunication requires energy supply to each participating RFID tag reader which can be problematic in view of portable devices powered by batteries or accumulators. And in certain circumstances the operation of a portable device is not wanted or even forbidden for example in airplanes or in hospitals. Assume a RFID tag reader embedded in a cellular telephone wherein the embedded RFID tag reader supports RFID tag reader—RFID tag reader intercommunication and the user of this cellular telephone wants to establish intercommunication with a fixed RFID tag reader. Due to the fact that the embedded RFID tag reader has to be energized, intercommunication is not possible in these aforementioned circumstances since the energizing of the embedded RFID tag reader results in an unwanted or forbidden energizing of the cellular phone.

Furthermore, RFID tag reader—RFID tag reader intercommunication competes with well established short range communication standards such as Bluetooth which are implemented in numerous state of the art portable terminals. The implementation of competing communication solutions offering comparable functionality is not economical, especially when considering that the implementation of support of RFID tag reader—RFID tag reader intercommunication is a complex undertaking.

The object of the present invention is, to provide an advanced reader device for radio frequency (RF) identification transponders which is at least adapted to communicate with a radio frequency identification transponder and which is able to provide radio frequency identification transponder functionality also during unpowered conditions.

The object of the present invention is achieved with a reader device as defined in claim 1. A portable electronic device as defined in claim 14 and a system comprising a portable electronic device and a reader device as defined in claim 17. Various embodiments according to the present invention are defined in the dependent claims.

In accordance with an aspect of the present invention, a reader device for radio frequency identification transponders is provided which comprises a radio frequency interface (also denoted as radio frequency front-end) and an antenna. The reader device is adapted to communicate at least with radio frequency identification transponders in a reader operation mode, i.e. in the commonly known manner for reader device operations with radio frequency transponders. The reader device comprises a transponder logic unit. The transponder logic unit is connected to the radio frequency interface such that the reader device acts as a radio frequency identification transponder in a transponder operation mode. In particular, the transponder logic allows for communicating with other reader devices for radio frequency identification transponders.

It shall be understood that the inclusion and integration of the transponder logic unit by the reader device according to an embodiment of the invention is not limited to a spatial integration since the given definition shall also include a logical association and integration of the transponder logic unit into the reader device. That means, on the one hand the reader device and transponder logic unit may be accommodated in a common housing and on the other hand both the reader device and the transponder logic unit may be enclosed in different housings or may be implemented separately but are interconnected with each other, such that they form a logical entity, wherein both the integration by space and by logic shall be within the scope of the invention. The transponder logic unit thus is connectable to the reader and assigned to the reader. Preferably it is connected and integrated.

In accordance with an embodiment of the present invention, the reader device additionally comprises a reader logic unit, which is connected to the radio frequency interface and which allows for operating the reader operation mode.

In accordance with an embodiment of the present invention, the transponder operation mode is operable independently from any power supply of the reader device. In accordance with an embodiment of the present invention, the reader device acts as a passive radio frequency identification transponder in the transponder operation mode. In accordance with an embodiment of the present invention, the reader device acts as a passive read-only radio frequency identification transponder in the transponder operation mode.

In accordance with an embodiment of the present invention, the transponder logic comprises a transponder memory. In accordance with an embodiment of the present invention, the transponder memory is a non-volatile storage component. In accordance with an embodiment of the present invention, the transponder memory is configurable storage component.

In accordance with an embodiment of the present invention, the transponder logic is coupled through a switch to the radio frequency interface. The switch is operable to select between the reader operation mode and the transponder operation mode.

In accordance with an embodiment of the present invention, the reader device operates in the transponder operation mode during periods of time, within which the reader device is not energized. In accordance with an embodiment of the present invention, the reader device operates automatically in the transponder operation mode during periods of time, within which the reader device is not energized.

In accordance with an embodiment of the present invention, the radio frequency interface is adapted to provide signals required for operation of the reader device in a reader operation mode and transponder operation mode.

In accordance with an embodiment of the present invention, the reader device supports near field communication (ECMA-340) standard. The reader device is operable with a passive communication mode and an active communication mode in the reader operation mode and the reader device is operable with a show communication mode in the transponder operation mode.

In accordance with an embodiment of the present invention, the reader device is operable with an active communication mode in the reader operation mode.

In accordance with an aspect of the present invention, a portable electronic device that is connected to a reader device for radio frequency identification transponders is provided. The reader device for radio frequency identification transponders comprises a radio frequency interface (radio frequency front-end) and an antenna. The reader device is adapted to communicate at least with radio frequency identification transponders in a reader operation mode. The reader device comprises additionally a transponder logic unit. The transponder logic unit is connected to the radio frequency interface such that the reader device acts as a radio frequency identification transponder in a transponder operation mode. In particular, the transponder logic allows for communicating with other reader devices for radio frequency identification transponders.

In accordance with an embodiment of the present invention, the reader device is a reader device according to anyone of the aforementioned embodiments of a reader device. In accordance with an embodiment of the present invention, the portable electronic device is enabled to communicate via a public land mobile network (PLMN).

In accordance with an aspect of the present invention, a system, which includes a portable electronic device and a reader device for radio frequency identification transponders, which is connected to the portable electronic device, is provided. The reader device for radio frequency identification transponders comprises a radio frequency interface (radio frequency front-end) and an antenna. The reader device is adapted to communicate at least with radio frequency identification transponders in a reader operation mode. The reader device comprises additionally a transponder logic unit. The transponder logic unit is connected to the radio frequency interface such that the reader device acts as a radio frequency identification transponder in a transponder operation mode. In particular, the transponder logic allows for communicating with other reader devices for radio frequency identification transponders.

In accordance with an embodiment of the present invention, the reader device is a reader device according to any of the aforementioned embodiments of a reader device. In accordance with an embodiment of the present invention, the portable electronic device is enabled to communicate via a public land mobile network (PLMN).

The accompanying drawings are included to provide a further understanding of the invention and are incorporated in and constitute a part of this specification. The drawings illustrate embodiments of the present invention and together with the description serve to explain the principles of the invention. In the drawings, FIG. 1 depicts a block diagram illustrating state of the art communications between RFID tag readers and RFID tags;

FIG. 2 depicts a block diagram illustrating function units of a RFID tag reader according to an embodiment of the invention;

Reference will be made in detail to the embodiments of the invention examples of which are illustrated in the accompanying drawings. Wherever possible the same reference numbers are used in the drawings and the description to refer to the same or like parts.

Figure 3A:
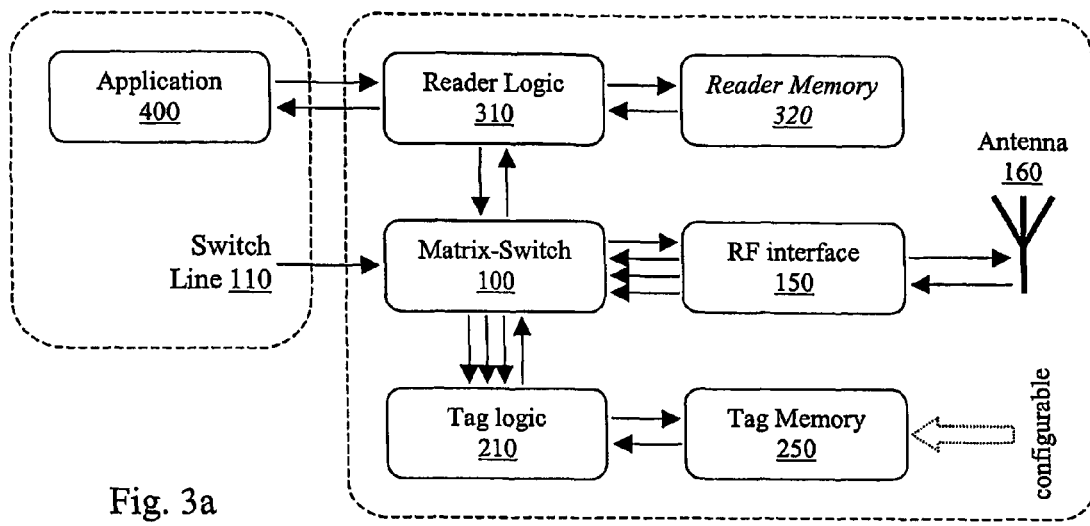
FIG. 3a depicts a block diagram illustrating an embodiment of a RFID tag reader according to the invention.

It shall be noted that the embodiments of a tag reader with respect to the present invention, which will be described below in detail are tag readers, which are attached to or embedded in a portable terminal such as shown in FIG. 1. In particular, the portable terminal 1 may be a mobile phone, a personal digital assistant, a smart phone, a mobile consumer electronic and the like, which may be enabled to communicate via wireless data communications such as a public land mobile network (PLMN), a wireless local area network (WLAN), a Bluetooth network and the like. The public land mobile network (PLMN) shall be understood as any currently used cellular data communication network or any cellular data communication network used in future. In particular, the public land mobile network (PLMN) may be a global communication system (GSM), a universal mobile telecommunication services terrestrial access network (UTRAN), a United States personal communication system (US PCS), a personal digital cellular system (PDC) and the like, only to enumerate a selection of mobile communication standards currently in use.

It shall be further noted that the description of the embodiments of a tag reader according to the invention will be explained in view of the near field communication standard (ECMA-340) published by ECMA International, Geneva, Switzerland, December 2002. In particular, the description will be will explained in view of the near field communication standard—interface and protocol (NFCIP-1).

FIG. 2 shows a diagram of functional blocks, which allow realizing a RFID tag reader device 600 with RFID tag functionality according to an embodiment of the present invention. The illustrated RFID tag reader device 600 includes a RFID tag reader unit 300 which shall represent the RFID tag reader functionality and a RFID tag unit 200, which shall represent the RFID tag functionality. Both functional units, i.e. the RFID tag reader unit 300 as well as the RFID tag unit 200, require a radio frequency (RF) interface (and a high frequency (HF) interface, respectively) and an antenna adapted to the radio frequency (RF) deployed for operating. The embodiment illustrated in FIG. 1 shows a common RF interface 150 and a common antenna 160 used by both functional units. It shall be understood that the radio frequency interface such as interface 150 as well as the antenna such as antenna 160, which are presented in the present description according to embodiment of the invention, are adapted to employ any suitable radio frequency used in the field of RFID tags and transponders, respectively. In particular, at least typical operation frequencies aforementioned shall be implementable with embodiments of the present invention.

In case of RFID tag reader functionality the antenna 160 is adapted to transmit one or more interrogation signals and to receive one or more response signals for retrieving information from a RFID tag. In view of the aforementioned near field communication standard (ECMA-340) the antenna 160 is adapted to allow communication in accordance with the standard. Depending on the capability of the RFID tag reader unit 200 the antenna is adapted to communicate with a RFID tag in passive communication mode and with another RFID tag reader device 600 in active communication mode.

In case of RFID tag functionality the antenna 160 is adequate to receive one or more interrogation signals and to transmit one or more response signals carrying information retrieved from the RFID tag unit 200.

The antenna 160 is connected to the RF interface 150 via one or more signal connections 40 which supplies RF/HF signals generated by the RF interface 150 to the antenna 160 and which accepts RF/HF signals received by the antenna 160.

The RF interface 150 is responsible for both modulating and demodulating the signals to be transmitted and received by the antenna 160, respectively. Therefore, the RF interface 150 couples to the RFID tag reader unit 300 and the RFID tag unit 200, respectively. In particular, the RF interface 150 receives from the RFID tag reader unit 300 signals to be modulated and transmitted and transmits demodulated signals to RFID tag reader unit 300. The RF interface 150 also transmits demodulated signals to the RFID tag unit 200 and receives signals from the RFID tag unit 200 to be modulated and transmitted. More particularly, the RF interface provides further signals necessary for the operation of the RFID tag unit 200 which are in detail a power supply signal (voltage signal) and a clock signal. The power supply signal is gained from the coupling of the interrogating electromagnetic field whereas the clock signal is obtained from the demodulator comprised in the RF interface. The power supply signal and the clock signal are obligate for operating the RFID tag unit 200 as a passive RFID tag energized by interrogating signal of a RFID tag reader device.

The RFD tag reader device 600 illustrated in FIG. 2 comprises moreover a switch 100, which is operated to switch between RFID tag reader functionality and RFID tag functionality. The switch 100 is interposed between RFID tag reader unit 300, RFID tag unit 200 and RF interface 150 and operated with a switching input to which a switching signal is provided via a switching line 110. In detail, the signal connections 20 carry at least signals generated by the RFD tag reader unit 300 to be modulated by the RF interface 150 and to be transmitted by the antenna 160 and signals received by the antenna 160 and demodulated by the RF interface 150 to be supplied to the RFID tag reader unit 300. The signal connections 20 are switched by the switch 100 to the RF interface 150 connected to the switch 100 via signal connections 30.

Analogously, the signal connections 50 carry at least signals received by the antenna 160 and demodulated by the RF interface 150 to be supplied to the RFID tag unit 200 and signals generated by the RFD tag unit 200 to be modulated by the RF interface 150 and to be transmitted by the antenna 160. The signal connections 50 are switched by the switch 100 to the RF interface 150 connected to the switch 100 via signal connections 30. The aforementioned power supply signal and clock signal are supplied from the RF interface 150 to the RFID tag unit 200 via the switch 100 and may be part of the signals transmitted via the signal connections 30 and signal connections 50.

Depending on the switching state or position of the switch 100, either the RFID tag reader unit 300 is coupled to the RF interface 150 or the RFID tag unit 200 is coupled to the RF interface 150. In the former case RFID tag reader functionality is available whereas in the latter case RFID tag functionality is available.

The RFID tag reader device 600 and hence the RFD tag reader unit 300 is provided with an interface indicated by communication connections 10 to allow an application 400, which is operated on a portable terminal 700 comparable to portable terminals 1 or 2, communicating with the RFID tag reader device 600 and in particular with the RFD) tag reader unit 300, respectively. The interface interfacing between RFID tag reader device 600 and application is established by appropriate hardware and software interfaces that allow access of the application 400 to the RFID tag reader device 600.

Referring back to near field communication standard (ECMA-340), the purposed RFID tag reader functionality and the RFID tag functionality as described above in view of an embodiment illustrated by functional units depicted in FIG. 2 enables to establish a further communication mode additional to the standardized passive and active communication mode.

As described in detail above, the field communication standard (ECMA-340) addresses the operation of RFID tag reader devices and provides the active communication mode, which is used preferably in communication with one or more RFID tags. Additionally, the field communication standard (ECMA-340) provides the passive communication mode, which is intended for communication with another RFID tag reader device. Both the active and passive communication modes require necessarily energizing of the communicating RFID tag reader device via a power supply. In case of the active communication mode the necessity of a power supply is obvious since communication with one or more passive RFID tags requires energizing of the passive RFID tags via one or more interrogating signals of the communicating RFID tag reader device.

Additionally, the active as well as passive communication modes allow operating reading functionality and writing functionality of the RFID tag reader device. That means, the RFD tag reader device having reading functionality is adapted to retrieve information stored in one or more RFID tags. The reading functionality is at least the basic functionality of a RFID tag reader device. The RFID tag reader device having writing functionality is adapted to add information to RFID tags to be stored and/or modify information stored in RFID tags. It shall be noted that the adding and/or modifying of information stored in RFID tags depends on the capability of the RFID tags and/or authorization of the RFID tag reader device. The writing functionality is an enhanced functionality of a RFID tag reader device.

The RFID tag functionality as described above in detail in view of an embodiment illustrated by functional units depicted in FIG. 2 may be employed to establish a new communication mode, which will be denoted as show communication mode. In the show communication mode the RFID tag functionality is switched while the RFID tag reader functionality is out of operation. The show communication mode is distinguished from the known communication modes therein that the RFID tag functionality provides the physical advantages of a passive RFID tag, which does not require any internal power supply. This is in clear contrast to the passive communication mode, which may be regarded as functionality, which simulates a RFID tag. This essential advantage will become more intellectual in view of the usage cases, which are presented below. Further, advantages addressing the implementation of the RFID tag functionality will become apparent in view of RFID tag reader devices according to embodiments of the present invention.

The information stored in the RFID tag unit 200 that can be retrieved by a RFID tag reader device 600 as illustrated above is stored in an adequate storage component. The storage component may be a read-only storage component or a configurable storage component. In case of a configurable storage component a number of storage technologies are applicable and in particular non-volatile configurable storage technologies are of interest.

In analogy to FIG. 1 it shall be assumed that the RFID tag reader device 600 as embodied in FIG. 2 is attached to or embedded in a portable terminal 700 such as portable terminals 1 and 2 depicted in FIG. 1. Conventionally, the RFID tag reader device 600 may be provided with an interface such as a serial interface interfacing data exchanged between the RFID tag reader device 600 and the portable terminal 700 such that applications executed on the portable terminal 700 can use the functionality, which is provided by the RFID tag reader device 600. An application program interface (API) layer may support the communication between applications such as applications 400 and 410 and the RFID tag reader device 600.

Figure 3B:
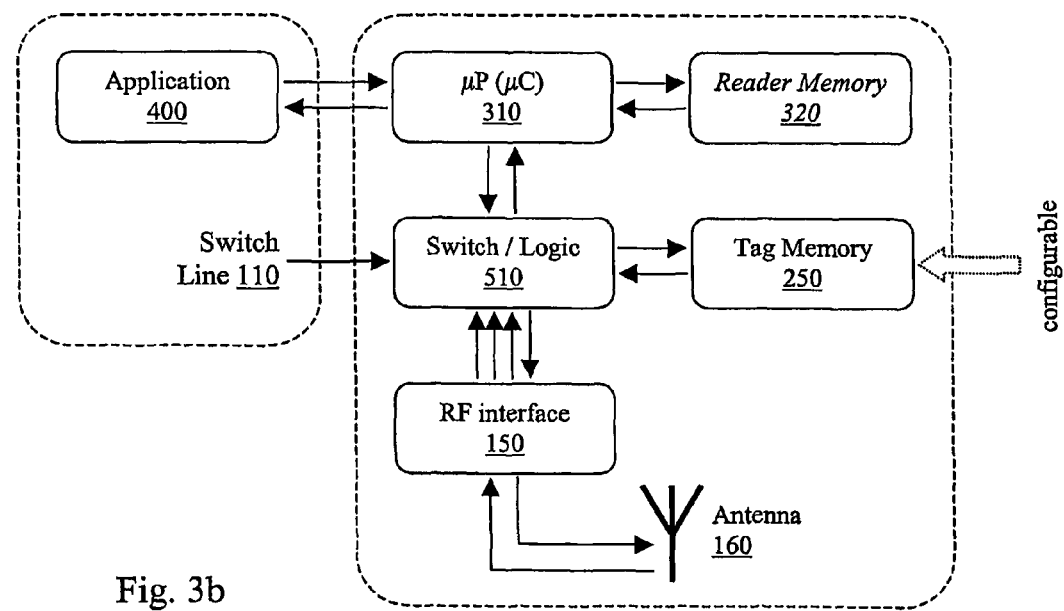
FIG. 3b depicts a block diagram illustrating an alternative embodiment of a RFID tag reader according to the invention.

Whereas the operation of a RFID tag reader device 600 according to the embodiment has been described by the means of functional units the following FIG. 3a and FIG. 3b illustrate more detailed embodied RFID tag reader device.

FIG. 3a depicts a block diagram, which illustrates an embodiment of a RFID tag reader device according to the present invention.

The tag reader device 600 comprises a reader logic 310, an optional reader memory 320, a RF interface 150 and an antenna 160. These components establish a complete conventional tag reader device. With respect to the present invention, the illustrated tag reader device 600 comprises further a matrix switch 100, a tag logic 210 and a tag memory 250. The tag reader device 600 is coupled to the terminal 700 via an appropriate interface such that the application 400 can communicate with the tag reader device 600. The illustrate tag reader device 600 corresponds in its design to the arrangement of the functional units explained with reference to FIG. 2.

The antenna 160 and the RF interface 150 are common units used for RFID tag reader operation and for RFID tag operation. The matrix switch 110 is controlled via the switch line 110, which is herein supplied with switching signal by the terminal 700. Alternatively, without leaving the scope of the invention, the switching state of the switch 100 may by also controlled by the RFID tag reader device 600 itself, which may ensure a higher readability. In show communication mode, as defined above, the antenna 160 and the RF interface 150 are coupled via the switch 100 to the tag logic 210, whereas in all other communication modes the antenna 160 and the RE interface 150 are coupled via the switch 100 to the reader logic 310. Since the RFID tag functionality corresponds in its externally visible physical properties to a passive RFID tag, the RF interface may provide additionally at least a power supply signal and a clock signal to the tag logic 210 via the switch 100 (shown) or directly unswitched (not shown).

In show communication mode, i.e. when operating RFID tag functionality, the RF interface 150 forms the interface between the analogue, radio frequency transmission channel from a requesting RFID tag reader device to the RFID tag and the tag logic 210 of the RFID tag. The modulated RE (HF) signal from the requesting RFID tag reader device is reconstructed in the RF interface 150 by demodulation to create a digital serial data stream for reprocessing in the tag logic. The tag logic 210 is preferably embodied as a digital logic serving as address and/or security logic. A clock-pulse generation circuit in the RF interface 150 generates the system clock for the data carrier from the carrier frequency of the RF (HF) field supplied by the requesting RFID tag reader device. The RF interface 150 may further incorporate a load modulator or backscatter modulator (or any alternative procedure, e.g. frequency divider), controlled by the digital data being transmitted, to return data to the requesting RFID tag reader device. Moreover the RF interface 150 draws current from the antenna 160 which is rectified and supplied to the tag logic 210 as a regulated supply voltage.

The tag logic 210 may support a passive read-only RFID tag implementation and a re-writeable RFID tag implementation. As soon as a passive read only RFID tag enters the interrogation zone of a RFID tag reader device it begins to continuously transmit information stored in the tag memory 250 associated with tag logic 210. In principle, the tag memory 250 illustrated as a separate component may be included in the tag logic 210. The stored information may comprise a tag identification number, which relates to the original purpose of the RFID tags. But the stored information is not limited thereto. Depending of the realization and complexity of the tag logic 210, also sophisticated operations on stored information is possible wherein the operations can be instructed by commands additionally transmitted in the interrogation zone, e.g. modulated on the interrogating signal. Typically, the communication between passive read-only RFID tags and the RFID tag reader devices is unidirectional, with the RFID tag sending its stored information to the RFID tag reader device continuously. But data transmission from the RFID tag reader device to the RFID tag is possible. A re-writeable RFID tag implementation that can be written with data by the RFID tag reader device can be realized with varying memory capacities which only depends in the implementation of the tag memory 250. Typically write and read access to the re-writeable RFID tag is often in blocks, which are formed by assembling a predefined number of bytes, which can then be read or written.

The tag logic 210 may be realized in a simple implementation as a state machine.

In active and/or passive communication modes, i.e. when operating RFID tag reader functionality, the RF interface 150 forms a transmitter and receiver.

The RF interface 150 should perform the following functions when operated in conjunction with RFID tag reader functionality. The RF interface 150 is adapted to generate radio/high (RF/HF) frequency transmission power serving as interrogating signal to activate RFID tags and supply RFID tags with power. Further, the RF interface 150 is adapted to modulate transmission signals on the carrier frequency to transmit data and/or instructions to the interrogated RFID tags and to receive and demodulate response signals transmitted back by the interrogated RFID tags.

The reader logic 310 may be realized as an application specific integrated circuit (ASIC) module, a microcontroller (μC), a microprocessor (μP) and the like. In order to allow communication with the terminal 700, in which the RFID tag reader device 600 is embedded or to which the RFID tag reader device 600 is attached, the reader logic 310 also provides an data communication interface such as a serial interface (e.g. a RS232 interface) to perform the data exchange between the RFID tag reader device 600 (slave) and the external application 400 (master) executed on the terminal 700.

The reader logic 310 may also be associated with an optional reader memory 320. Conventionally, a distinct reader memory 320 is not necessary for RFID tag reader functionality, but the reader memory 320 may be used as a buffer storage for communication with the terminal 700 as well as with a RFD tag or another RFID tag reader device.

In view of the present invention, the tag memory 250 may be configurable; i.e. information stored in the tag memory may be modified, added, processed and/or deleted. According to an embodiment of the invention, the configuration of the information stored in the configurable tag memory 250 may be limited to the terminal 700 and applications executed thereon. Moreover, the access to the configurable tag memory 250 may be limited to one or more specific applications executed on the terminal 700 to ensure data integrity, which may be required and necessary, respectively, depending on the kind of information stored.

The access to the tag memory 250 to configure information stored therein may be established via a dedicated interface (not shown) connecting the terminal 700 and one or more applications, respectively, executed thereon to the memory tag 250. Alternatively, the access to the tag memory 250 to configure information stored therein may be established (mediated) via the reader logic 310 and the microprocessor (μP)/microcontroller (μC), respectively, which is provided with an interface interfacing data communication between RFID tag reader device 600 and terminal 700 and one or more applications executed thereon, respectively.

In case the configuration of the information stored in the tag memory 250 is limited to e.g. a specific application executed on the terminal 700 the externally visible RFID tag property is comparable to a read-only RFID tag. That means, another communicating RFID tag reader device recognizes the RFID tag reader device 600 as a read-only RFID tag when the RFID tag reader device 600 is switched to RFID tag functionality. In particularly, the other communicating RFID tag reader device recognizes the RFID tag reader device 600 as a passive read-only RFID tag when the RFID tag reader device 600 is switched to RFID tag functionality.

The configurable tag memory 250 may be understood as dynamic tag memory 250, which on the one side shows read-only properties to other communicating RFID tag reader devices, whereas the information stored in the tag memory 250 is modifiable under circumstances enlightened above. In principle, the storage capacity of the tag memory 250 is not limited such that the capacity may be adapted to range of applications, to which the information stored in the tag memory 250 is dedicated. In particular, the storage capacity may be adapted to such an amount, which is typically for passive read-only small RFD tags. The distance between a passive read-only RFID tag and a RFID tag reader device for communicating therebetween is limited due to the fact that field energy of the interrogating signal, which is emitted by the RFID tag reader device, is used for energizing the passive RFID tag. This implies that the information stored in the passive RFID tag has to be transmitted as long as the passive read-only RFID tag and the RFID tag reader device retrieving the information stored in the passive RFID tag are spaced apart in an adequate distance even in case one of the communicating devices (the RFID tag and the RFID tag reader device, respectively) are in motion. The smaller the storage capacity and the amount of information communication between the RFID tag and the RFID tag reader device the higher the probability of reliable transmission. A typical passive read-only RFID tag and therefore also the tag memory 250 may be provided with a storage capacity of 100 bytes to 150 bytes but the present invention shall not be understood as limited thereto.

Alternatively, a security logic, which can be implemented in the tag logic 210, may allow providing configurability of the tag memory 250 similar to a RFID tag of re-writeable type and in particular similar to a passive re-writeable RFID tag. In this case the security logic ensures information integrity and/or authenticated access.

A configurable tag memory may be realized as a non-volatile storage component. For example programmable read-only memory (PROM) or electrical erasable read-only memory (EEPROM) may be employed. But also promising non-volatile configurable storage technologies such as magnetic random access memory (MRAM), ferrite random access memory (FRAM) or non-volatile random access memory on the basis of polymer material may be employed. The enumeration is not limited thereto but further non-volatile configurable storage technologies may be used. Non-volatile configurable storage technologies are primarily addressed since one of the advantages of the present invention is that the show communication mode (which corresponds to the explained RFID tag functionality of the RFID tag reader device 600) is independence from any power supply.

FIG. 3b depicts a block diagram illustrating an alternative embodiment of a RFID tag reader device according to the present invention. The RFID tag reader device embodiment illustrated in FIG. 3b is comparable to the RFID tag reader device embodiment shown in FIG. 3a in several points. A common RF interface 150 and a common antenna 160 serve for RFID tag reader functionality and RFID tag functionality. The reader logic 310 is realized as a microcontroller (μC) 310 and a microprocessor (μP) 310, respectively, which provides for data communication interface to the terminal 700 and the application 400 executed thereon, respectively, and which operates the interface and protocol framework for communicating with RFID tags (passive communication mode) and in particular, when supporting active communication mode, for communicating with RFID tag reader devices. An optional reader memory 320 is associated with the microcontroller (μC) 310 and a microprocessor (μP) 310, respectively.

A switch/logic component 610 is interposed between RF interface 150 and reader logic 310 to switch between RFID tag reader functionality and RFID tag functionality as described in detail above. The switch/logic component 610 implement tag logic necessary for providing RFID tag functionality. Correspondingly, the tag memory 250 is connected to the switch/logic component 610.

The common RF interface 150 provides signals to the switch/logic component 610, which are required for operation of RFID tag reader functionality and RFD tag functionality, wherein in this embodiment the switch/logic component 610 passes through signals to the microprocessor (μP) 310, which are required by the microprocessor (μP) 310. The passing through of the signals depend on the switching state of the switch/logic component 610. Alternatively, the switch/logic component 610 and the microprocessor (μP) 310 may be implemented in a common logic component (not shown), which is adapted to operate functions of the switch/logic component 610 as well as functions of the microprocessor (μP) 310.

As aforementioned, the switching state of the switch/logic component 610 and the switch 100 defines the functionality of the RFID tag reader device 600, respectively. The switching state and therefore the switching operation is important to ensure proper operation of the RFD tag reader device 600 as enlightened. According to an embodiment, the switching state of the switch/logic component 610 and the switch 100 is controlled by a switching signal supplied thereto via the switch line 110. The switching signal is generated by the terminal 700, to which the RFID tag reader device 600 is connected. The controlling of the switching state by an specific application executed on the terminal 700 may be critical and less reliable, respectively, since in case of a sudden or unexpected loss of power of the terminal 700 the switching state is undefined or the switching state remains in its former switching state such that RFID tag functionality may not be switched. This situation may be unsatisfactory.

In a more reliable embodiment of the RFID tag reader device 600 according to the present invention, the selecting of the switching state may be semi-autonomously or autonomously (corresponding to a semi-autonomous operation mode and a autonomous operation mode, respectively). Semi-autonomous operation mode means that for example in case of a sudden or unexpected power loss or always when the RFID tag reader device 600 is out of power supply the RFID tag functionality is selected and the switching state is correspondingly adapted thereto. Analogously, the RFD tag reader device 600 may be operable with RFID tag reader functionality in case the terminal 700 and one or more applications executed thereon, respectively, instruct to select/switch to RFID tag reader functionality. So if no explicit indication to select RFID tag reader functionality is present the RFID tag reader device 600 is operated in RFID tag functionality by default.

In autonomous operation mode the switch, i.e. the switch 100 and the switch/logic component 610, respectively, comprise a switching logic which autonomously selects and switches between the RFID tag functionality and the RFID tag reader functionality.

It shall be noted, that the RFID tag reader functionality may support passive communication mode and active communication mode in accordance with near field communication standard (ECMA-340) and the RFID tag functionality may support show communication functionality which has been defined above and described in detail.

Use Cases

In the following an overview of example usage cases shall be given in view of which the advantages of the present invention will become clearly apparent.

(a) Access Key

A typical range of application of RFID tags is access control to areas of controlled/surveyed/limited access and the use of RFID tags for substituting conventional keys. A RFID tag may be used to open a door, to start a vehicle, to get access to a computer and the like. Such RFID tags are for example embedded in keys of state of the art motor vehicles to prevent burglary or replace the key to open the door to the office. For access control, a RFID tag reader device of an access control system retrieves information from a RFID tag, which is conventionally a passive read-only RFID tag. The information is checked by the access control system to decide whether access is to be granted or not.

In case a RFID tag reader device which supports passive communication mode such as enlighten above is used for such an application the requirement of power supply for operating the RFID tag reader device in passive communication mode is a serious drawback. As soon as the power supply runs out of energy, the RFID tag reader device is not operable any more and access is denied due to the disfunction of the RFID tag reader device which is adapted to simulate a RFID tag in the passive communication mode.

The implementation of the show communication mode and the RFID tag functionality, respectively, with respect to an embodiment of the present invention guarantees that information required for access is always available for retrieval independent for any power supply.

In accordance with an embodiment of the present invention, which comprises a configurable tag memory also referred to a dynamic tag memory, the configurable tag memory allows storing access information, modifying stored access information, deleting stored access information and/or adding new access information to the tag memory. Such a configurable tag memory is for example useful in conjunction with temporary access information, which for example may be employed to open a door of a hotel room, to start a rented motor vehicle or to withdraw access of an employee to its office after dismissal.

(b) Presence Indication/Control

Presence identification and presence control relates for example to an application, which is well known as electronic article surveillance, which is operated as theft protection system commerce. Further, presence identification may also be used in rage of applications in which attendance lists are maintained such as presence control of employees, presence of students in the school and the like. Such a presence identification and presence control may be operated similar to an electronic article surveillance, which is preferably installed at entrances of buildings within interrogation zones. Each person who passes an interrogation zone and who intends to indicate his presence carries a RFID tag which stores corresponding identification information associated with the person.

In case a RFID tag reader device, which supports passive communication mode such as enlighten above, is used for such this presence identification/presence control application the requirement of power supply for operating the RFID tag reader device in passive communication mode is a serious drawback and is in analogy to the first use case explained above. As soon as the power supply runs out of energy, the RFID tag reader device is not operable any more and presence identification/presence control is not possible any mode due to the disfunction of the RFID tag reader device also in the passive communication mode.

The implementation of the show communication mode and the RFID tag functionality, respectively, with respect to an embodiment of the present invention guarantees that information required for presence identification/presence control is always available for retrieval independent from any power supply.

(c) Electronic Ticket, Payment, Loyalty Card, Business Card/Vcard Information, . . . .

The description of the uses case "access key" and the use case "presence indication/presence control" applies in analogous way also to further similar range of applications. In common to all use cases, information is provided to be retrieved by a RFID tag reader device independent to a powering of the device implementing the RFID tag reader device of the above described type. Such information may comprise information about electronic ticket, electronic payment, loyalty card, business card, vcard and the like. The enumeration of useful information, which is provided to be retrieved, is unlimited such that the enumerated set of information is just exemplary.

The improved RFID tag reader device in accordance with an embodiment of the invention is always applicable in an advantageous manner in case the provided information shall be dead certain retrievable independent from any power supply. In particular, the power supply of a portable electronic device, which also servers to power the RFID tag reader device, is not reliable since the user may forget to recharge an accumulator energizing the portable electronic device or may forget to insert new batteries replacing the used up ones.

The advantage of a configurable tag memory is obvious in conjunction with the aforementioned use cases.

(d) Supply Chain Management

Supply chain management is essential in modern production environment to track individually each product manufactured. For tracking purposes of supply chain management RFID tags attached to each product allow automatically for identification and position of each product being provided with an RFID tag comprising corresponding information required for tracking.

During production of electronic devices and especially of portable electronic devices the devices are unpowered and are not equipped with an operating power supply, respectively. In this case even a RFID tag reader device operable with passive communication mode is not applicable for tracking purpose of supply chain management since passive mode communication requires energizing of the RFID tag reader device. In contrast thereto, a RFD tag reader device according to an embodiment of the present invention is useful to provide the information required for tracking. The RFID tag reader device according to an embodiment of the present invention may be provided with information required for tracking, which is stored in the tag memory and is capable to provide the stored tracking information due to the fact that the RFID tag functionality (show communication mode) corresponds in its functionality to a passive RFID tag. Moreover, in case the tag memory is embodied configurable the tracking information is stored in the tap memory for tracking during manufacturing and is erased thereafter such that the RFID tag functionality can be used for any range of applications such as described above.

(e) Pairing Information (Bluetooth)

The improved RFID tag reader device in accordance with an embodiment of the invention may be employed to provide paring information, which is required to establish data communication connection between a device which is connected to the improved RFID tag reader device and a device which is connected to a RFID tag reader device retrieving the pairing information from the improved RFID tag reader device. The pairing information may comprise configuration data to set up for example a Bluetooth based wireless communication link. Therefore, the configuration data may comprise device specific information relating to the wireless communication connection.

The configurable tag memory allows for providing valid paring information even in case the configuration data have to be modified or substituted due to modification onto the interface to which the pairing information relate.

It shall be noted that the present invention has been described with respect to a RFID tag reader device which supports RFID tag reader—RFID tag communication and RFID tag reader—RFID tag reader communication. In view of the provided description it shall be understood, that the support of RFID tag reader—RFID tag reader communication is an optional feature and not mandatory for the RFID tag reader device according to an embodiment of the invention. The RFID tag functionality of the RFID tag reader device according to an embodiment of the invention, also referred as show communication mode, may allow for substituting RFID tag reader—RFID tag reader communication in may range of applications. With reference to the use case "pairing information" it can be recognized that in this case the support of full RFID tag reader—RFID tag reader communication, which is quit complex, is in view of an economical standpoint not sensible.

It shall be further noted in view of the economical standpoint that the common use of the RF interface and the antenna is economical sensible and allows for offering a RFID tag reader device of good value.

It will be obvious for those skilled in the art that as the technology advances, the inventive concept can be implemented in a broad number of ways. The invention and its embodiments are thus not limited to the examples described above but may vary within the scope of the claims.

The invention claimed is:

1. A reader device comprising:
a power supply configured to power the reader device;
a reader logic unit connectable to a radio frequency interface and configured to cause the reader device to operate in a reader operation mode by transmitting interrogation signals to detect and communicate with radio frequency identification transponders and by simulating an active radio frequency identification tag to communicate with another radio frequency identification reader;
a transponder logic unit which is connectable to the radio frequency interface, wherein the transponder logic unit is configured to cause the reader device to operate in a show communication mode wherein the reader device acts as a passive radio frequency identification transponder; and
a switching unit configured to automatically switch the reader device between the reader operation mode and the show communication mode, wherein when the reader device is receiving power from the power supply the switching unit automatically switches the reader device to the reader operation mode, and wherein when the reader device is not receiving power from the power supply the switching unit automatically switches the reader device to the show communication mode.

2. The reader device according to claim 1, wherein the show communication mode is operable independently from the power supply of the reader device and a power supply of a portable device to which the reader device is coupled, and wherein the transponder logic unit is energized by an interrogating signal.

3. The reader device according to claim 1, wherein the reader device acts as a passive read-only radio frequency identification transponder in the show communication mode.

4. The reader device according to claim 1, wherein the transponder logic unit comprises a transponder memory.

5. The reader device according to claim 4, wherein the transponder memory is non-volatile.

6. The reader device according to claim 4, wherein the transponder memory is configurable.

7. The reader device according to claim 1, wherein the transponder logic unit is coupled through the switching unit to the radio frequency interface.

8. The reader device according to claim 1, wherein the reader device operates autonomously in the show communication mode during periods of time, within which the reader device is not energized from the power supply of the reader device.

9. The reader device according to claim 1, wherein the radio frequency interface is adapted to provide signals required for operation of the reader device in the reader operation mode and the show communication mode.

10. The reader device according to claim 1, wherein the reader device supports near field communication (ECMA-340) standard, and wherein the reader device is operable with a passive communication mode in the reader operation mode.

11. The reader device according to claim 10, wherein the reader device is operable with an active communication mode in the reader operation mode.

12. A portable terminal comprising the reader device according to claim 1.

13. The reader device according to claim 5, wherein the transponder memory is configurable.

14. The portable terminal according to claim 12, wherein the portable terminal is enabled to communicate via a public land mobile network.

15. A method comprising:
causing a reader device to operate, via a reader logic unit, in a reader operation mode by transmitting interrogation signals to detect and communicate with radio frequency identification transponders and by simulating an active radio frequency identification tag to communicate with another radio frequency identification reader;
causing the reader device to operate, via a transponder logic unit, in a show communication mode wherein the reader device acts as a passive radio frequency identification transponder; and
switching automatically, the reader device between the reader operation mode and the show communication mode,
wherein when the reader device is receiving power from a reader device power supply causing the automatic switching to automatically switch the reader device to the reader operation mode, and
wherein when the reader device is not receiving power from the reader device power supply causing the automatic switching to automatically switch the reader device to the show communication mode.

16. The method according to claim 15, wherein the show communication mode is operable independently from the power supply of the reader device and a power supply of a portable device to which the reader device is connected, and wherein the transponder logic unit is energized by an interrogating signal.

17. The method according to claim 15, further comprising causing the reader device to act as a passive read-only radio frequency identification transponder in the show communication mode.

18. The method according to claim 15, further comprising causing the reader device to operate autonomously in the show communication mode during periods of time, within which the reader device is not energized from the power supply of the reader device.

19. The method according to claim 15, further comprising providing signals required for operation of the reader device in the reader operation mode and the show communication mode via a common radio frequency interface.

20. The method according to claim 15, wherein the reader device supports near field communication (ECMA-340) standard, and wherein the reader device is operable with a passive communication mode in the reader operation mode.

21. The method according to claim 20, wherein the reader device is operable with an active communication mode in the reader operation mode.

* * * * *